(12) United States Patent
Ashimine et al.

(10) Patent No.: US 12,386,113 B2
(45) Date of Patent: Aug. 12, 2025

(54) DISPLAY DEVICE AND SPATIAL INPUT DEVICE INCLUDING THE SAME

(71) Applicant: ALPS ALPINE CO., LTD., Tokyo (JP)

(72) Inventors: Katsunari Ashimine, Fukushima (JP); Hiroki Sato, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 493 days.

(21) Appl. No.: 17/867,947

(22) Filed: Jul. 19, 2022

(65) Prior Publication Data

US 2023/0021677 A1     Jan. 26, 2023

(30) Foreign Application Priority Data

Jul. 21, 2021   (JP) .................. 2021-120761

(51) Int. Cl.
*F21V 8/00*    (2006.01)
*G02B 27/28*   (2006.01)
*G06F 3/01*    (2006.01)

(52) U.S. Cl.
CPC ......... *G02B 6/0056* (2013.01); *G02B 27/283* (2013.01); *G06F 3/011* (2013.01)

(58) Field of Classification Search
CPC ...... G02B 6/0056; G02B 27/283; G06F 3/011
USPC ........................................ 359/246
See application file for complete search history.

(56) References Cited

U.S. PATENT DOCUMENTS

| | | |
|---|---|---|
| 2011/0170184 A1 | 7/2011 | Wolk |
| 2018/0188548 A1 | 7/2018 | Frayne et al. |
| 2018/0284470 A1 | 10/2018 | Yamamoto et al. |
| 2018/0372627 A1 | 12/2018 | Craig et al. |

FOREIGN PATENT DOCUMENTS

| | | |
|---|---|---|
| JP | 2013-517528 A | 5/2013 |
| JP | 2017-107165 A | 6/2017 |
| JP | 2018-081138 A | 5/2018 |
| JP | 2019-066833 A | 4/2019 |
| JP | 2019-101055 A | 6/2019 |

OTHER PUBLICATIONS

Extended European Search Report for European Patent Application No. 22184588.6 dated Jan. 16, 2023, 5 pages.

*Primary Examiner* — Bumsuk Won
*Assistant Examiner* — Grant A Gagnon
(74) *Attorney, Agent, or Firm* — Crowell & Moring LLP

(57) ABSTRACT

A display device includes a transparent light guiding layer having a bottom face on which a light diffusing region is formed as a design, a retroreflective layer, a polarizing beam that allows light having a first polarization direction to pass therethrough, and an emission unit configured to emit into the light guiding layer the light having the first polarization direction, or light having a different second polarization direction. When light having the first polarization direction is emitted, light reflected by the light diffusing region passes through the polarizing beam splitter such that the design is viewable. When light having the second polarization direction is emitted, light reflected by the retroreflective layer passes through the polarizing beam splitter such that an aerial image of the design is viewable.

8 Claims, 7 Drawing Sheets

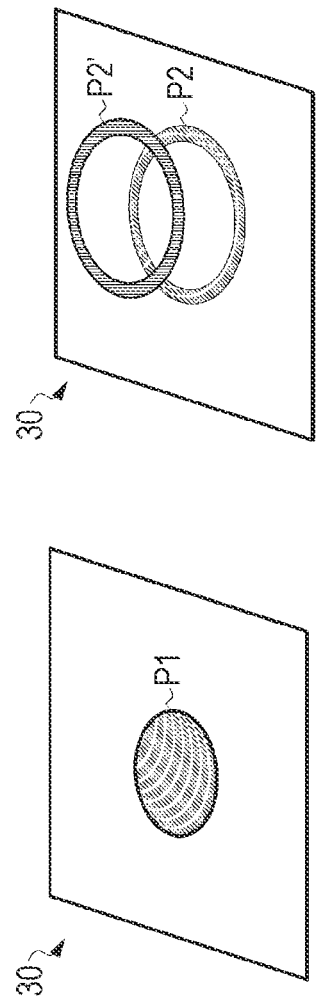
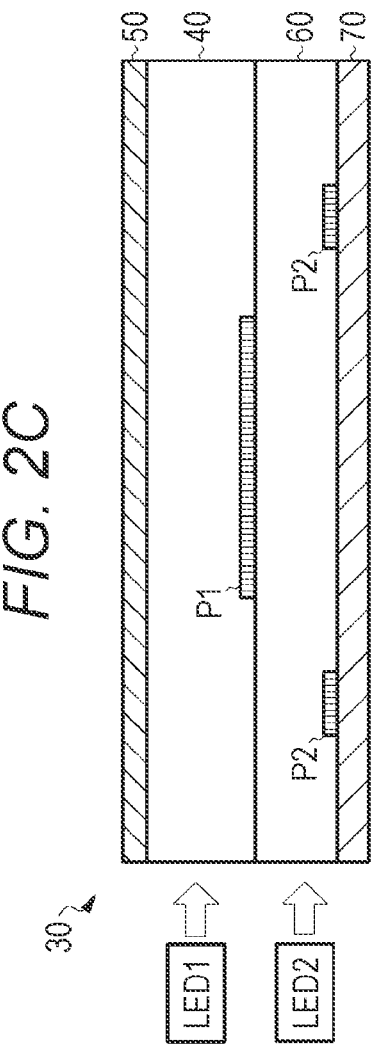

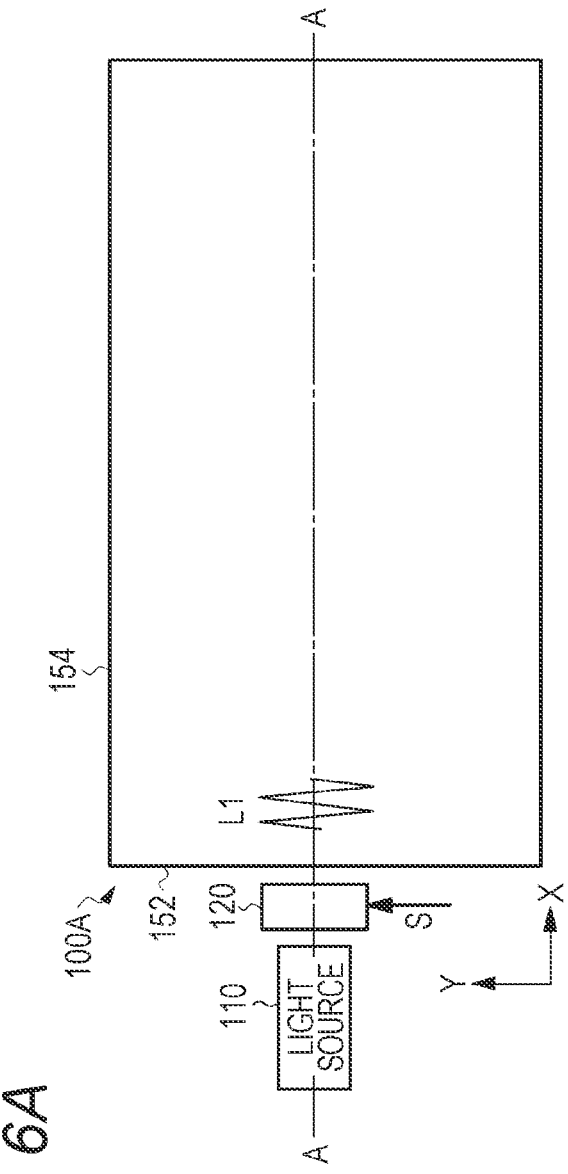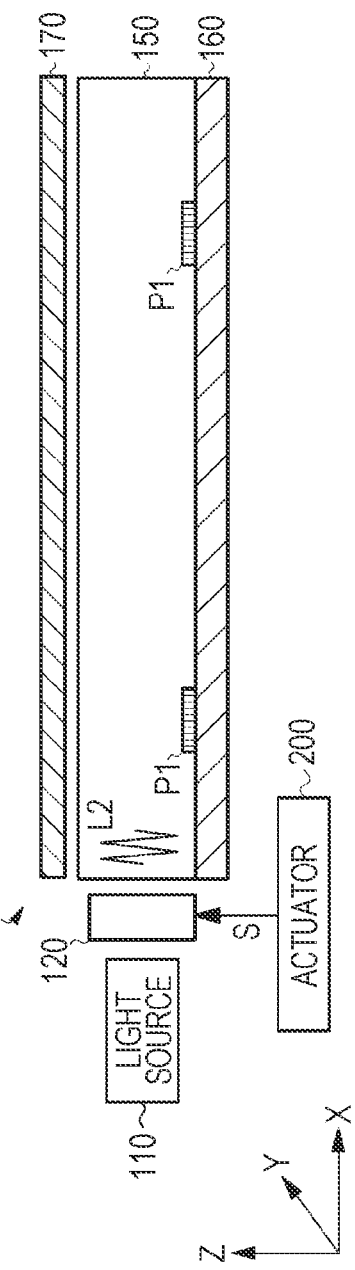

DISPLAY DEVICE AND SPATIAL INPUT DEVICE INCLUDING THE SAME

RELATED APPLICATION

The present application claims priority to Japanese Patent Application Number 2021-120761, filed on Jul. 21, 2021, the entirety of which is hereby incorporated by reference.

BACKGROUND

Field

The present disclosure relates to a display device that displays an image in midair with retroreflection.

Description of the Related Art

JP 2013-517528 A discloses a stereoscopic display that has a lens structure or a prism structure for providing stereoscopic effect in a display, enabling stereoscopic vision. In addition, aerial imaging by retro-reflection (AIRR) has been known. For example, a display device in JP 2017-107165 A includes two retroreflective members of which one is disposed on the emission axis of a light source, enabling wider-angle observation of an image formed in midair. For easy adjustment of the position at which an image is formed, an image display device in JP 2018-81138 A includes a half mirror, a retroreflective member, and an image output device disposed in parallel to each other, in which a change of the position of the half mirror or the position of the image output device enables adjustment of the position of image formation. In order to inhibit a reduction in the viewability of an image, an image display device in JP 2019-66833 A reduces the number of times of transmission of light through a retardation member (λ/4 plate), and additionally prevents dust or the like from entering between a retroreflective member and the retardation member. For achievement of a reduction in device thickness, an aerial picture display device in JP 2019-101055 A includes a display and a retroreflective member disposed in parallel to a beam splitter, and a deflecting optical element disposed on the display.

SUMMARY

FIG. 1 is a schematic sectional view of a conventional display device that displays an aerial image. The display device 10 includes a light source 14, such as a display, that outputs an image, a beam splitter 16, and a retroreflective member 18 disposed in a housing 12. Light L1 from the light source 14 reflects off the beam splitter 16 and then the reflected light L2 travels to the retroreflective member 18. The retroreflective member 18 serves as an optical member that reflects light in the direction counter to the direction of incident light. Reflected light L3 from the retroreflective member 18 travels in the direction counter to the direction of the incident light L2. Light L4 transmitted through the beam splitter 16 re-diverges after converging, so that a picture 20 is formed in midair just before the eyepoint U of an observer. When the light L2 reflected by the beam splitter 16 regular-reflects off a protective film or the like on the surface of the retroreflective member 18, a virtual image 22 of the light source 14 is generated behind the retroreflective member 18. From the eyepoint U of the user, the virtual image 22 is viewed in superimposition on the background of the aerial image 20, resulting in a reduction in the viewability of the aerial image 20.

As illustrated in FIG. 2C, the present inventors have proposed that a back picture and an aerial image are made different in display such that stereoscopic effect is produced. This display device 30 includes a first light guiding layer 40, a half mirror 50 disposed above or upper than the first light guiding layer 40, a second light guiding layer 60 disposed below or lower than the first light guiding layer 40, a retroreflective layer 70 disposed below or lower than the second light guiding layer 60, an LED 1 that irradiates a side portion of the first light guiding layer 40, and an LED 2 that irradiates a side portion of the second light guiding layer 60. The first light guiding layer 40 has a bottom face on which a design P1 (e.g., a circle) is formed as a light diffusing face. The second light guiding layer 60 has a bottom face on which a design P2 (e.g., a ring shape) is formed as a light diffusing face at a position not overlapping the position of the design P1. When the LED 1 lights up (LED 2 in non-lighting), the light travels in the first light guiding layer 40 and reflects off the light diffusing face P1, so that the design P1 is viewed from the eyepoint U of the user, as illustrated in FIG. 2A.

On the other hand, when the LED 2 lights up (LED 1 in non-lighting), the light travels in the second light guiding layer 60 and reflects off the light diffusing face P2. Part of the reflected light reflects off the half mirror 50, and the reflected light from the half mirror 50 reflects off the retroreflective layer 70, so that the light re-forms an image through the half mirror 50. As a result, as illustrated in FIG. 2B, from the eyepoint U of the user, the design P2 and an aerial image P2' thereof are viewed. Such a display device requires the light guiding layer 40 for display of the design P1 and the light guiding layer 60 for display of the aerial image P2' and further requires intentional non-overlap in position between the upper design P1 and the lower design P2, leading to problems.

The present disclosure has been made in order to solve such conventional problems, and an object of the present disclosure is to provide a display device improved in the viewability of an aerial image and a spatial input device including the display device.

A display device according to the present disclosure is capable of displaying an aerial image with retroreflection and includes: a transparent light guiding layer, the light guiding layer having a bottom face or a bottom portion on which a light diffusing region is formed as a design; a retroreflective layer disposed on a side on which the light guiding layer has the bottom face; a polarizing beam splitter disposed on a side on which the light guiding layer has an upper face, the polarizing beam splitter allowing light having a first polarization direction to pass through the polarizing beam splitter; and an emission unit configured to emit, into the light guiding layer, the light having the first polarization direction or light having a second polarization direction different from the first polarization direction, in which when the light having the first polarization direction is emitted, light reflected by the light diffusing region passes through the polarizing beam splitter such that the design is viewable, and when the light having the second polarization direction is emitted, light reflected by the retroreflective layer passes through the polarizing beam splitter such that the aerial image of the design is viewable.

According to an aspect, when the light having the second polarization direction is emitted, light reflected by the light diffusing region is reflected by the polarizing beam splitter, and the light reflected by the polarizing beam splitter is reflected by the retroreflective layer and then passes through the polarizing beam splitter. According to an aspect, the emission unit emits the light having the first polarization direction to a first side portion of the light guiding layer, or emits the light having the second polarization direction to a second side portion orthogonal to the first side portion of the light guiding layer. According to an aspect, the emission unit is capable of selectively emitting the light having the first polarization direction or the light having the second polarization direction to a first side portion of the light guiding layer. According to an aspect, the emission unit includes a polarizing plate capable of making a change in a polarization direction, generates the light having the first polarization direction with the polarizing plate in a first position, and generates the light having the second polarization direction with the polarizing plate in a second position. According to an aspect, the first polarization direction and the second polarization direction each correspond to linear polarization and are orthogonal in an oscillation direction.

A spatial input device according to the present disclosure includes: the display device described above; a detection unit configured to detect selection of the design or the aerial image displayed by the display device by an operation object; and a control unit configured to control the emission unit, based on a detection result from the detection unit. According to an aspect, in response to selection of the aerial image by the operation object, for notification of selection determination, the control unit causes display of the design.

According to the present disclosure, control of the polarization direction of light to be emitted to a light guiding layer controls the ratio of brightness between a design and an aerial image, so that an improvement can be made in the viewability of the aerial image. Furthermore, selective emission of light having a first polarization direction or light having a second polarization direction enables a seamless switch in display between the design and the aerial image.

BRIEF DESCRIPTION OF THE DRAWINGS

FIGS. 2A, 2B, and 2C are explanatory views of another exemplary display device that displays an aerial image;

FIG. 6A is a plan view of a display device according to a second embodiment of the present disclosure, and FIG. 6B is a sectional view taken along line A-A of FIG. 6A.

DETAILED DESCRIPTION

Embodiments of the present disclosure will be now described. A display device according to the present disclosure displays a picture with retroreflection in a three-dimensional space, without requiring any particular glasses or the like. According to an aspect, the display device according to the present disclosure is applied to a user input interface with a picture displayed in midair. Note that the drawings for reference in the following embodiments include exaggerations and emphases for easy understanding of the disclosure, and thus it should be noted that the drawings do not necessarily indicate the shapes or scales of real products.

Figure 1:
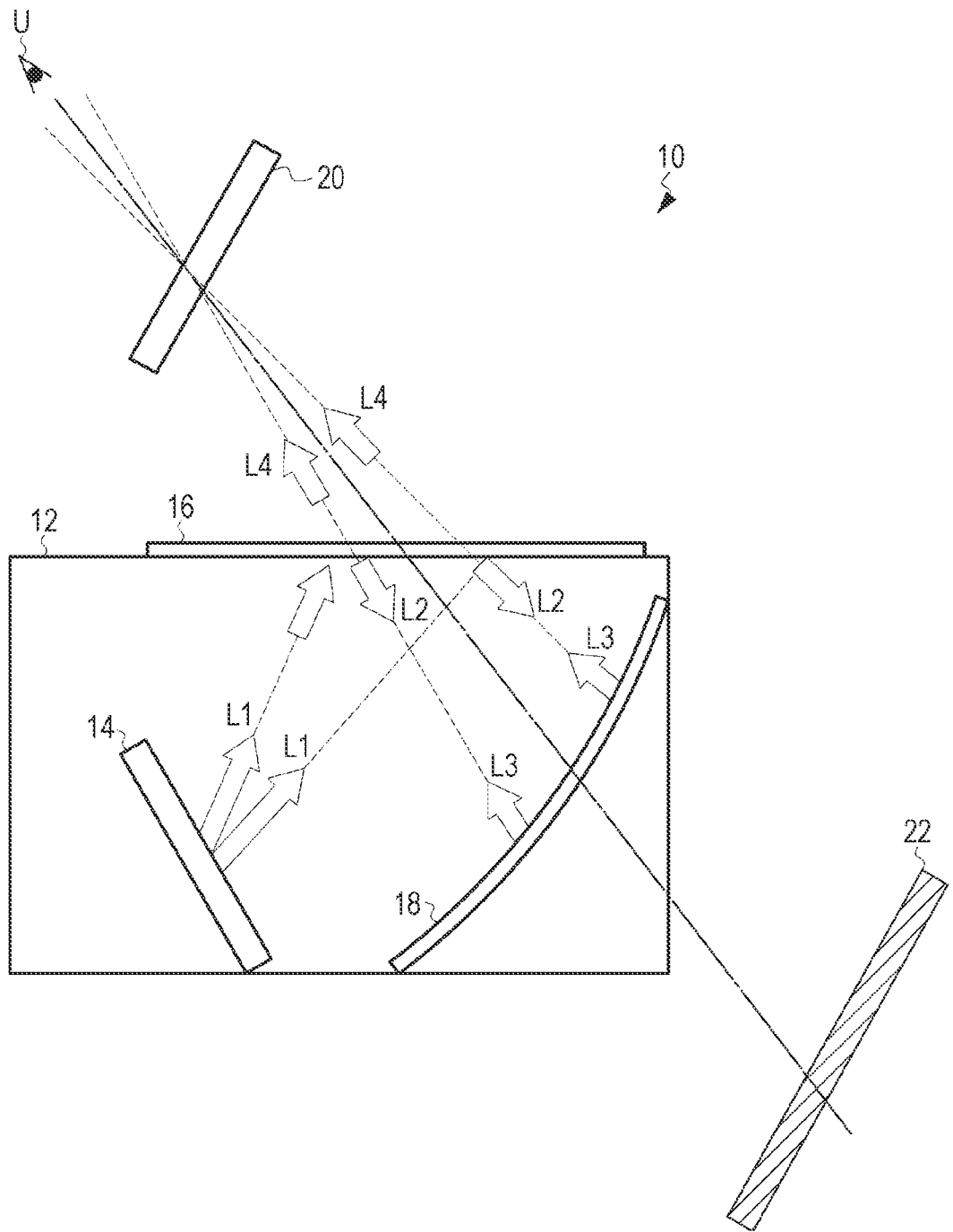
FIG. 1 is a schematic sectional view of a conventional display device that displays an aerial image.
Figure 3A:
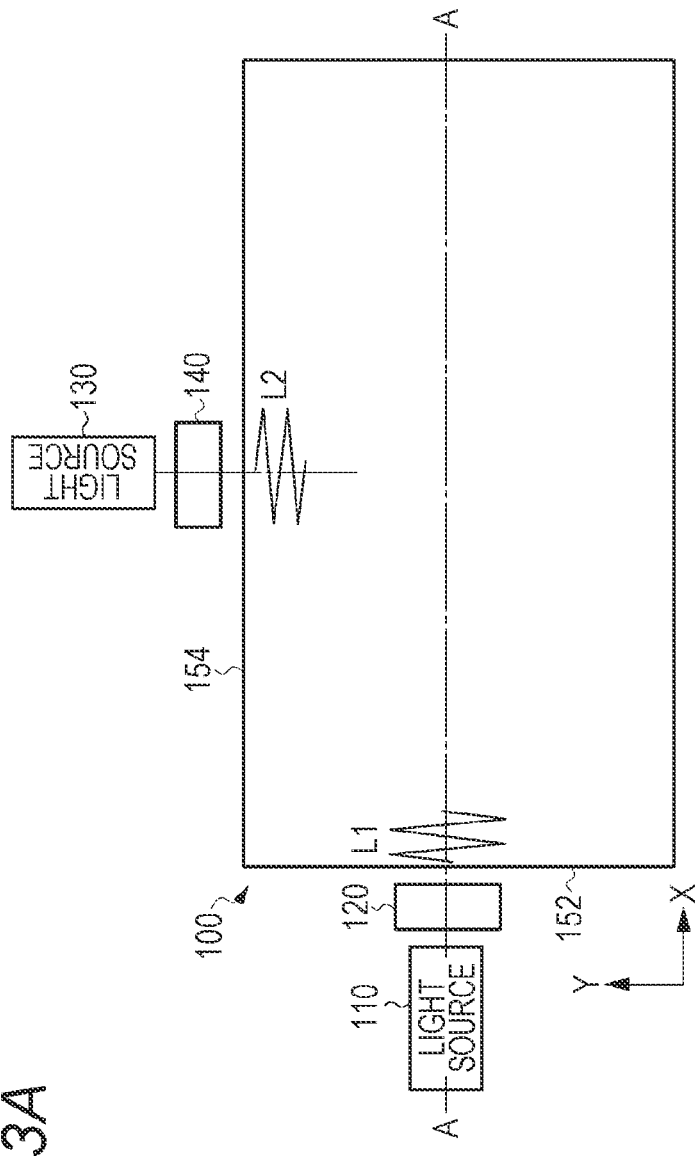
FIG. 3A is a plan view of a display device according to an embodiment of the present disclosure.
Figure 3B:
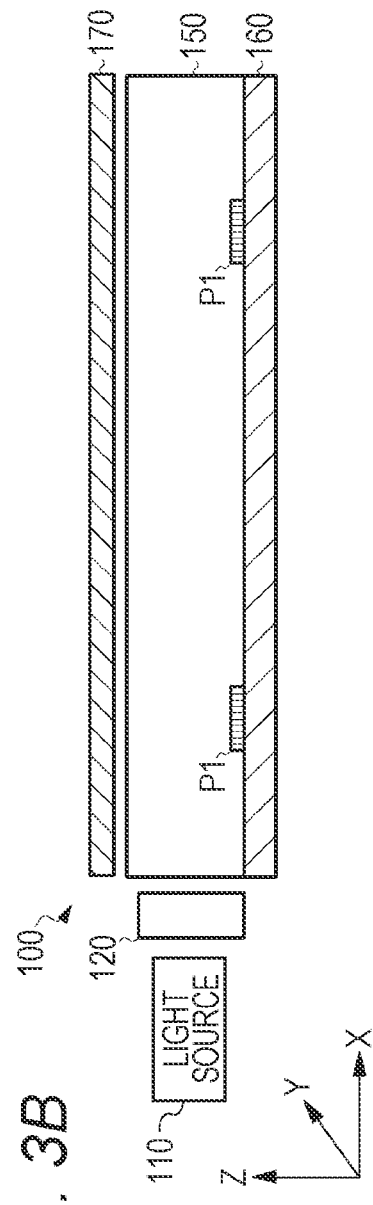
FIG. 3B is a sectional view taken along line A-A of FIG. 3A.

Next, an embodiment of the present disclosure will be described in detail. FIG. 3A is a schematic plan view of a display device according to an embodiment of the present disclosure, and FIG. 3B is a schematic sectional view of the display device taken along line A-A of FIG. 3A. The display device 100 according to the present embodiment controls the polarization direction of light to be emitted to a side portion of a light guiding layer (or a light guiding plate) to adjust the ratio of brightness between an aerial image and an original picture, and enables a seamless switch in display between the aerial image and the original picture.

The display device 100 according to the present embodiment includes a first light source 110, a first polarizing plate (polarizing filter) 120, a second light source 130, a second polarizing plate 140, a light guiding layer 150, a retroreflective layer 160, and a polarizing beam splitter 170.

The first light source 110 is disposed at a first side portion 152 of the light guiding layer 150 and emits light having a certain emission angle (or a certain radiation angle) in the X direction. An example that can be used for the first light source 110 is, but is not particularly limited to, a light-emitting element with no polarization, such as a light-emitting diode. The wavelength (color) of light that the first light source 110 emits is not particularly limited, and thus, for example, may be identical to or different from the wavelength of light that the second light source 130 emits. In a case where the first side portion 152 of the light guiding layer 150 has a certain length in the Y direction, the first light source 110 may include a plurality of light-emitting elements disposed in the Y direction.

The first polarizing plate (polarizer) 120 is disposed facing the first light source 110. The first polarizing plate 120 is, for example, a polarizing film or a reflective polarizing element (e.g., dual brightness enhancement film (DBEF)) and serves as an optical element that generates linearly polarized light oscillating in a certain direction in a plane orthogonal to the travel direction of light emitted from the first light source 110. The first polarizing plate 120 is adjusted such that the direction of linear polarization is almost identical to the polarization direction of light transmissive through the polarizing beam splitter 170. In the illustrated example, the first polarizing plate 120 generates linearly polarized light that oscillates in almost the Y direction. Linearly polarized light L1 generated by the first polarizing plate 120 enters the light guiding layer 150 through the first side portion 152, resulting in uniform irradiation inside the light guiding layer 150.

The second light source 130 is disposed at a second side portion 154 of the light guiding layer 150 and emits light having a certain emission angle (or a certain radiation angle) in the Y direction. An example that can be used for the second light source 130 is, but is not particularly limited to, a light-emitting element with no polarization, such as a light-emitting diode. In a case where the second side portion 154 of the light guiding layer 150 has a certain length in the X direction, the second light source 130 may include a plurality of light-emitting elements disposed in the X direction.

The second polarizing plate (polarizer) 140 is disposed facing the second light source 130. The second polarizing plate 140 is similar in configuration to the first polarizing plate 120, and generates linearly polarized light oscillating in a certain direction in a plane orthogonal to the travel direction of light emitted from the second light source 130. Although the second polarizing plate 140 generates linearly polarized light identical in direction to that of the first polarizing plate 120, the second light source 130 and the second polarizing plate 140 are disposed at the second side portion 154 orthogonal to the first side portion 152. Thus, linearly polarized light L2 that enters the light guiding layer 150 after generated by the second polarizing plate 140 is orthogonal to the linearly polarized light L1 from the first polarizing plate 120, namely, the polarization direction of the light L2 is almost orthogonal to the polarization direction of light transmissive through the polarizing beam splitter 170. The linearly polarized light L2 generated by the second polarizing plate 140 enters the light guiding layer 150 through the second side portion 154, resulting in uniform irradiation inside the light guiding layer 150.

The light guiding layer 150 corresponds to a transparent optical member in a tabular shape or a film shape, having a flat upper face, a flat bottom face, and side faces connecting the upper face and the bottom face. The plane shape of the light guiding layer 150 is not particularly limited and thus is, for example, rectangular. In a case where the light guiding layer 150 is rectangular in shape, the first side portion 152 and the second side portion 154 are almost orthogonal to each other. A publicly known light guiding layer, for example, made of glass, an acrylic plastic, a polycarbonate resin, or a cycloolefin-based resin, may be used as the light guiding layer 150. The light guiding layer 150 has a certain thickness in the Z direction for entry of light from the first light source 110 or the second light source 130.

The light guiding layer 150 has, on its bottom portion or bottom face, a light diffusing face P1 as a design (e.g., an original image) for light diffusion or light scattering in the Z direction. For the light diffusing face P1, for example, with a laser or by printing, the bottom face of the light guiding layer 150 is processed so as to have a fine structure. Desirably, provided is a structure enabling conservation of the state of polarization, such as a microstructure or a light scattering medium including dispersed fine particles. The shape or size of the light diffusing face P1 is not particularly limited. If the display device 100 is used for spatial input, the light diffusing face P1 is processed so as to have a design (e.g., an icon in shape, such as an input button in shape) corresponding to user input. In the illustrated example, the light diffusing face P1 is annular in shape (e.g., shaped like a ring).

The retroreflective layer 160 is formed below or lower than the light guiding layer 150. The retroreflective layer 160 serves as an optical member that reflects light in the direction counter to the direction of incident light. The retroreflective layer 160 is not particularly limited in configuration, and thus, for example, includes a prism type retroreflective element, such as a triangular pyramid type retroreflective element, or a full-cube corner type retroreflective element, or a bead type retroreflective element.

The retroreflective layer 160 is adjusted such that the oscillation direction of linear polarization of reflected light is different from the oscillation direction of linear polarization of incident light. In order to increase the ratio of brightness between the design P1 and an aerial image P1' thereof, preferably, the linear polarization of reflected light is adjusted orthogonally to (at an angle of 90° to) the linear polarization of incident light, such that reflected light can pass through the polarizing beam splitter 170. The method of adjusting the polarization direction of reflected light is not particularly limited. Thus, the polarization direction may be adjusted on the basis of the number of times of reflection of light on the retroreflective layer 160, or the polarization direction of reflected light may be adjusted by a retardation film for causing phase difference, attached to the reflective face of the retroreflective layer 160. Furthermore, a retardation film, such as a λ/4 film, may be interposed between the retroreflective layer 160 and the light guiding layer 150.

The polarizing beam splitter 170 is disposed on the side on which the light guiding layer 150 has its upper face. The polarizing beam splitter 170 serves as a polarization splitting element capable of splitting incident light into the p polarization component and the s polarization component, and enables transmission of the component of light linearly polarized in a specific direction. The direction of linear polarization of the first polarizing plate 120 is adjusted so as to be almost identical to the direction of linear polarization of light that passes through the polarizing beam splitter 170. Thus, most of the linearly polarized light L1 from the first polarizing plate 120 reflected in the Z direction from the light diffusing face P1 of the light guiding layer 150 passes through the polarizing beam splitter 170. Meanwhile, most of the linearly polarized light L2 from the second polarizing plate 140 reflected in the Z direction from the light diffusing face P1 of the light guiding layer 150 reflects off the polarizing beam splitter 170. The light reflected by the polarizing beam splitter 170 travels to the retroreflective layer 160, and then the light reflected by the retroreflective layer 160 travels in the direction counter to the direction of the incident light. Moreover, with adjustment of the polarization direction of the incident light (e.g., adjustment to linear polarization rotated by 90°), most of the reflected light passes through the polarizing beam splitter 170.

Next, the display operation of the display device 100 according to the present embodiment will be described. The lighting/non-lighting of the first light source 110 and the lighting/non-lighting of the second light source 130 are controlled by a control unit (not illustrated). According to an aspect, the first light source 110 lights up with the second light source 130 in non-lighting, and the second light source 130 lights up with the first light source 110 in non-lighting. For example, in a case where the display device 100 is applied to a spatial input device, the control unit controls the first light source 110 and the second light source 130 between lighting and non-lighting in accordance with the input-operation state of the user, or controls the first light source 110 and the second light source 130 between lighting and non-lighting in accordance with the aim of display of the display device 100.

Figure 4A:
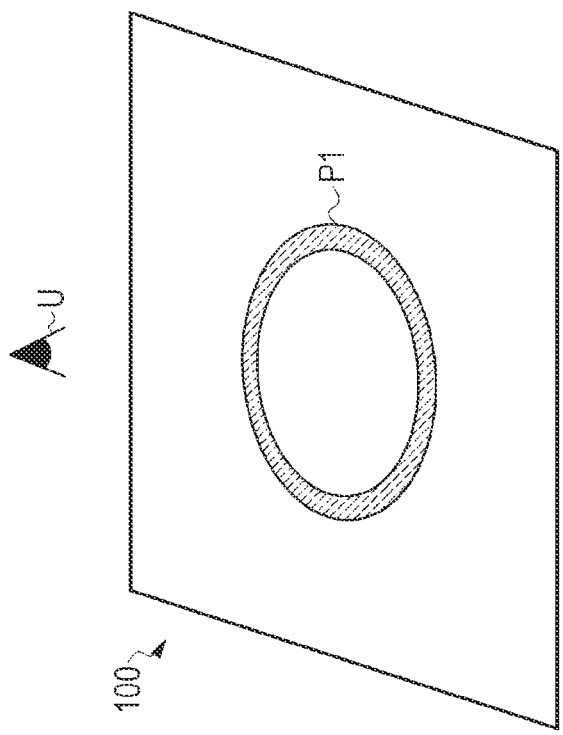
FIG. 4A illustrates an example of a design P1 viewed from above with a first light source in lighting.
Figure 4B:
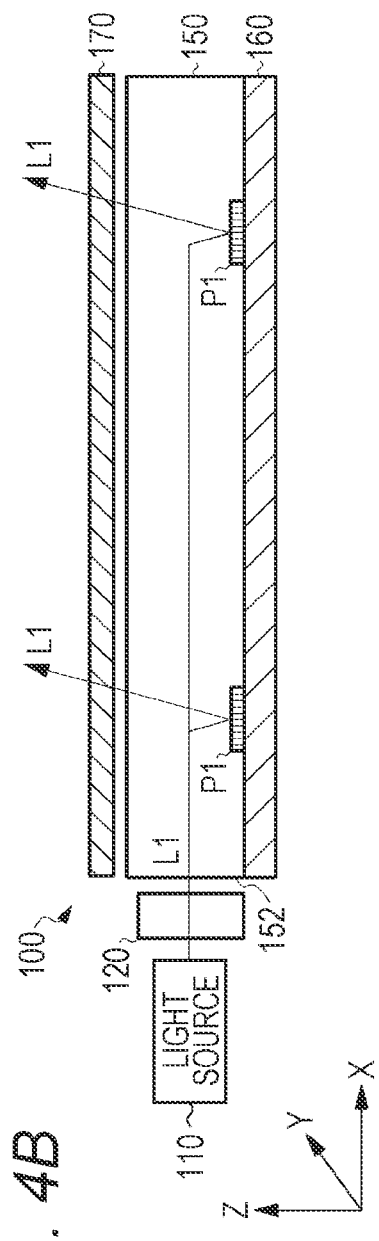
FIG. 4B is a schematic view of the travel direction of light emitted from the first light source.

FIG. 4A illustrates an example of the design (light diffusing face) P1 viewed by the user with the first light source 110 in lighting, and FIG. 4B is a schematic view of the travel direction of light from the first light source 110. Light L1 emitted from the first light source 110 is converted to linearly polarized light L1 by the first polarizing plate 120, and then the light L1 enters the light guiding layer 150 through the side portion 152, resulting in irradiation in the light guiding layer 150. Part of the light L1 is reflected in the upper direction (Z direction) by the light diffusing face P1. At this time, the linear polarization of the light L1 is almost conserved. The direction of linear polarization of the light L1 reflected by the light diffusing face P1 is almost identical to the polarization direction of light that passes through the polarizing beam splitter 170, so that most of the light L1 passes through the polarizing beam splitter 170. As a result, when the user observes the display device 100 from the eyepoint U in the Z direction, the user can view the design P1, which is the light diffusing face.

Figure 5A:
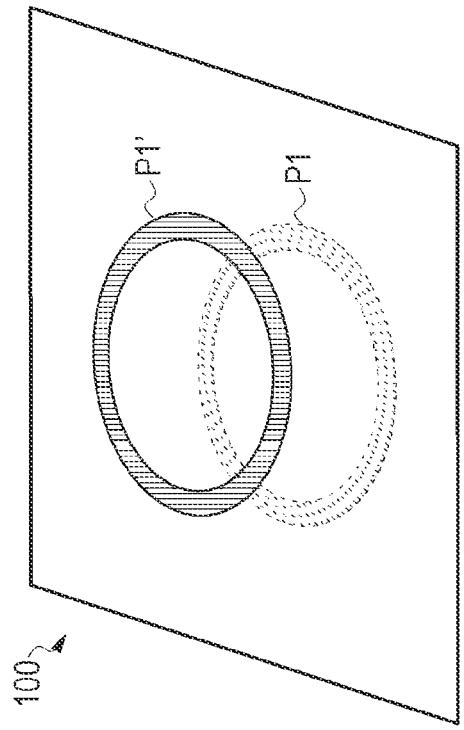
FIG. 5A illustrates an example of an aerial image P1' viewed from above with a second light source in lighting.
Figure 5B:
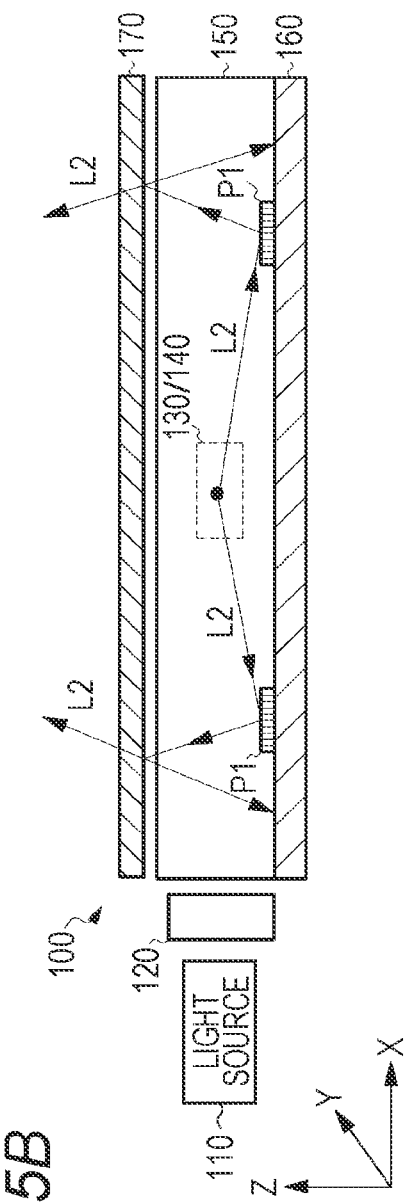
FIG. 5B is a schematic view of the travel direction of light emitted from the second light source.

FIG. 5A illustrates an example of the aerial image P1' of the design (light diffusing face) P1 viewed by the user with the second light source 130 in lighting, and FIG. 5B is a schematic view of the travel direction of light from the second light source 130. Light L2 emitted from the second light source 130 is converted to linearly polarized light L2 by the second polarizing plate 140, and then the light L2 enters the light guiding layer 150 through the side portion 154, resulting in irradiation in the light guiding layer 150. Part of the light L2 is reflected in the upper direction (Z direction) by the light diffusing face P1. At this time, the linear polarization of the light L2 is almost conserved. The direction of linear polarization of the light L2 reflected by the light diffusing face P1 is almost orthogonal to the polarization direction of light that passes through the polarizing beam splitter 170, so that most of the light L2 reflects off the polarizing beam splitter 170.

The light reflected by the polarizing beam splitter 170 travels to the retroreflective layer 160 and then reflects thereof in the direction counter to the incident direction. At this time, the state of linear polarization of the light L2 is not conserved, namely, the light L2 is brought into an unpolarized state due to reflection by the retroreflective layer 160, or the original linear polarization is brought to linear polarization rotated by a certain angle through the retardation film. As a result, most or part of the light L2 reflected by the retroreflective layer 160 passes through the polarizing beam splitter 170, so that the aerial image P1' is generated due to image reformation. When the user observes the display device 100 from the eyepoint U in the Z direction, the user can view the aerial image P1' of the design P1 floating off the surface of the display device 100. Because the first light source 110 remains in non-lighting, the entire brightness is suppressed, resulting in an improvement in the contrast or viewability of the aerial image P1'.

According to the present embodiment as above, control of the polarization direction of light that enters the light guiding layer 150 controls the ratio of brightness between the design P1 and the aerial image P1', so that an improvement can be made in the viewability of the aerial image P1'. A switch in lighting/non-lighting between the first light source 110 and the second light source 130 enables a seamless switch in display between the design P1 and the aerial image P1'.

Note that, in the above embodiment, with a light source and a polarizing plate in combination, linearly polarized light enters the light guiding layer 150, but this is not limiting. In addition, in a case where a light-emitting element that emits linearly polarized light is used, such as a laser diode, a polarizing plate is not necessarily required, and thus light emitted from the laser diode may enter the light guiding layer 150 directly, through no polarizing plate.

In the above embodiment, provided are the first light source 110 and the second light source 130. In a case where light having the same wavelength (same color) is used, light emitted from a single light source may be split into two beams of light by a beam splitter, a waveguide or the like such that the split beams of light are emitted, respectively, to the first polarizing plate 120 and the second polarizing plate 140.

Next, a second embodiment of the present disclosure will be described. In the first embodiment, beams of light different in the polarization direction enter the light guiding layer 150 through the side portions 152 and 154. In the second embodiment, beams of light different in the polarization direction enter a light guiding layer 150 through a side portion 152.

FIG. 6A is a plan view of a display device 100A according to the second embodiment, and FIG. 6B is a schematic sectional view taken along line A-A of FIG. 6A. The display device 100A includes a first light source 110 disposed on the side on which the light guiding layer 150 has the side portion 152, a first polarizing plate 120, and an actuator 200 capable of controlling the polarization direction of the first polarizing plate 120. In response to a drive signal S from a control unit (not illustrated), the actuator 200 rotates the first polarizing plate 120, to control the polarization direction of light L1 that enters the light guiding layer 150 through the first polarizing plate 120. As illustrated in FIG. 6A, with the first polarizing plate 120 in a first position, the oscillation direction of linear polarization of the light L1 is almost parallel to the Y direction. When the actuator 200 rotates the first polarizing plate 120 by 90° from the first position, as illustrated in FIG. 6B, the oscillation direction of linear polarization of light L2 emitted through the first polarizing plate 120 is almost parallel to the Z direction.

With the first polarizing plate 120 in the first position, as described in the first embodiment, the light L1 reflects off a light diffusing face P1, and then the reflected light passes through a polarizing beam splitter 170, so that the user can view the design P1.

With the first polarizing plate 120 in a second position, light L2 emitted through the first polarizing plate 120 reflects off the light diffusing face P1. Furthermore, the reflected light reflects off the polarizing beam splitter 170, and then the reflected light reflects off a retroreflective layer 160. Then the reflected light passes through the polarizing beam splitter 170, so that an aerial image P1' of the design P1 is generated due to image reformation. When observing the display device 100A from above, the user can view the aerial image P1'.

According to the present embodiment, beams of light different in the polarization direction enter the light guiding layer through one side portion, and thus the display device 100A enables achievement of miniaturization and space saving. Note that, in the above embodiment, with the first polarizing plate 120, a switch is made in the polarization direction of light emitted from one light source, but this is not limiting. A first light source 110 and a first polarizing plate 120 in combination and a second light source 130 and a second polarizing plate 140 in combination may be disposed at the side portion 152 of the light guiding layer 150, such that the linear polarization of the first polarizing plate 120 and the linear polarization of the second polarizing plate 140 are mutually orthogonal in direction.

Figure 7A:
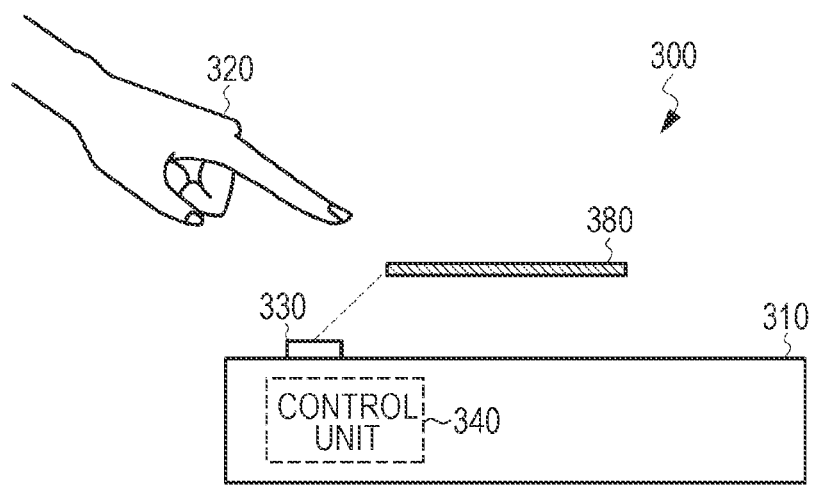
FIGS. 7A and 7B illustrate a spatial input device, to which a display device is applied, according to an embodiment of the present disclosure.

Next, a third embodiment of the present disclosure will be described. The third embodiment relates to a spatial input device in which the display device according to the first embodiment or the second embodiment is applied to a user input interface. FIG. 7A illustrates an exemplary spatial input device, to which a display device 100 or 100A is applied, according to the present embodiment. The spatial input device 300 includes a housing 310 in which the display device 100 or 100A is housed, a three-dimensional range sensor 330 that detects a three-dimensional range to an operation object (e.g., a user's finger) 320, and a control unit 340. In some embodiments, the control unit 340 may be implemented with circuitry, a controller, a hardwired processor, and/or a processor configured to execute instructions stored in a memory.

Figure 7B:
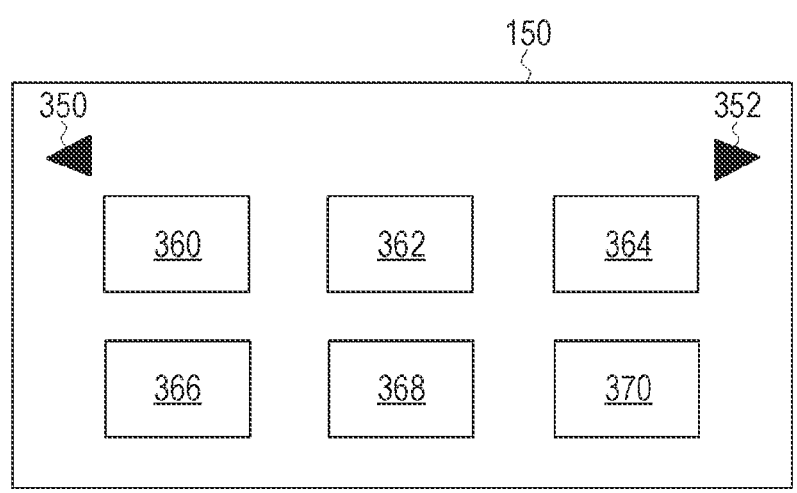

For example, as illustrated in FIG. 7B, the light guiding layer 150 has a bottom face on which a design (e.g., a light diffusing face) for displaying input buttons, such as a left scroll key 350, a right scroll key 352, and icon images 360 to 370, is formed. When the control unit 340 causes the first light source 110 to light up, the user can view the input buttons 350 to 370 on the surface of the housing 310. When the control unit 340 causes the second light source 130 to light up, the user can view an aerial image 380 of the input buttons floating off the housing 310.

The control unit 340 receives a detection result from the three-dimensional range sensor 330, recognizes an input button to which the operation object 320 is close, on the basis of the detection result, and determines that the recognized input button has been selected by the user.

According to an aspect, in order to prompt the user to select an input button from the aerial image 380, the control unit 340 causes the second light source 130 to light up. In response to selection of an input button, the control unit 340 causes the first light source 110 to light up (second light source 130 in non-lighting), so that the user is notified of input determination due to a switch from the aerial image 380.

Note that switching of the aerial image 380 is not limited to the above. For example, for an ordinary input operation, the first light source 110 may light up to display the design (e.g., original image). For notification of input determination, the second light source 130 may light up to display the aerial image 380. According to another aspect, for notification of input determination, the control unit 340 may cause the first light source 110 and the second light source 130 to light up simultaneously to display both of the design and the aerial image 380. Furthermore, the method of detecting the operation object 320 is not limited to the above. For example, a proximity sensor with infrared light, a capacitive detection sensor, a mechanical switch, or an image pickup element may be used to detect the position of the operation object 320.

As above, the spatial input device according to the present embodiment makes a seamless switch in display between the aerial image 380 and the design (e.g., original image). Thus, provided can be an input device enabling visualization of a switch between contactless input and contact input, depending on the purpose of use. Since the ratio of brightness of a display picture is controlled, a user interface enhanced in operability can be provided.

The spatial input device according to the present embodiment can be applied to any user input, and can be applied to, for example, a computer device, in-vehicle electronic equipment, an ATM at a bank or the like, a ticket purchasing machine at a station or the like, or an input button for an elevator.

Although there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims, and equivalents thereof.

What is claimed is:

1. A display device capable of displaying an aerial image with retroreflection, the display device comprising:
   a transparent light guiding layer, the light guiding layer having a bottom face or a bottom portion on which a light diffusing region is formed as a design;
   a retroreflective layer disposed on a side on which the light guiding layer has the bottom face;
   a polarizing beam splitter disposed on a side on which the light guiding layer has an upper face, the polarizing beam splitter allowing light having a first polarization direction to pass through the polarizing beam splitter; and
   an emission unit configured to emit, into the light guiding layer, the light having the first polarization direction or light having a second polarization direction different from the first polarization direction,
   wherein when the light having the first polarization direction is emitted, light reflected by the light diffusing region passes through the polarizing beam splitter such that the design is viewable, and
   wherein when the light having the second polarization direction is emitted, light reflected by the retroreflective layer passes through the polarizing beam splitter such that the aerial image of the design is viewable.

2. The display device according to claim 1, wherein when the light having the second polarization direction is emitted, light reflected by the light diffusing region is reflected by the polarizing beam splitter, and the light reflected by the polarizing beam splitter is reflected by the retroreflective layer, and then passes through the polarizing beam splitter.

3. The display device according to claim 1, wherein the emission unit emits the light having the first polarization direction to a first side portion of the light guiding layer, or emits the light having the second polarization direction to a second side portion orthogonal to the first side portion of the light guiding layer.

4. The display device according to claim 1, wherein the emission unit is capable of selectively emitting the light having the first polarization direction or the light having the second polarization direction to a first side portion of the light guiding layer.

5. The display device according to claim 4, wherein the emission unit includes a polarizing plate capable of making a change in a polarization direction, generates the light having the first polarization direction with the polarizing plate in a first position, and generates the light having the second polarization direction with the polarizing plate in a second position.

6. The display device according to claim 1, wherein the first polarization direction and the second polarization direction each correspond to linear polarization and are orthogonal in an oscillation direction.

7. A spatial input device comprising:
   the display device according to claim 1;
   a detection unit configured to detect selection of the design or the aerial image displayed by the display device by an operation object; and
   a control unit configured to control the emission unit, based on a detection result from the detection unit.

8. The spatial input device according to claim 7, wherein in response to selection of the aerial image by the operation object, for notification of selection determination, the control unit causes display of the design.

* * * * *